Figure 1:
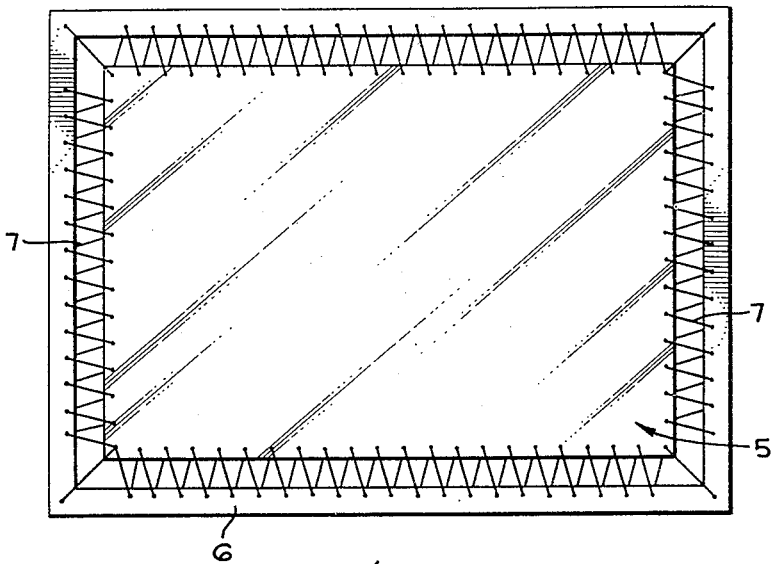

Feb. 17, 1953  J. A. GIBBONS  2,628,534
NEUTRAL DENSITY FILTER SCREEN
Filed April 3, 1951

JAMES A. GIBBONS,
INVENTOR.

BY
ATTORNEY

Patented Feb. 17, 1953

2,628,534

UNITED STATES PATENT OFFICE 2,628,534

NEUTRAL DENSITY FILTER SCREEN

James A. Gibbons, North Hollywood, Calif., assignor to Warner Bros. Pictures, Inc., Burbank, Calif., a corporation of Delaware Application April 3, 1951, Serial No. 218,968

4 Claims. (Cl. 88—109)

This invention relates to screens, and particularly to light intensity reducing screens for balancing the intensity of two light sources.

In the art of motion picture production, many scenes within the camera viewing angle are illuminated by a combination of daylight and artificial light, or parts of the scene are illuminated with daylight and other parts with artificial light. For instance, in the photographing of an indoor scene of a room, the camera angle may include a portion of the interior illuminated by normal artificial light and a window or door through which an outside area is seen by the camera, the outdoor area being illuminated by intense sunlight. Under these conditions, the outside area has a very strong illumination, and it is impractical to illuminate the interior to the same intensity for several reasons, such as the necessity for many lamps, the elimination of detail in the shadows, and inconvenience to the actors. However, by reducing the light intensity from the outside area, the indoor area may be artificially illuminated in the normal manner, and the film will be properly exposed, and thus, provide a better quality picture.

The present invention, therefore, is directed to a neutral density light reducing screen which reduces the light over all wave lengths of the visible spectrum in equal amounts, so that the exposure of the outside area and interior will have the same definition and proper proportioning in the finished print. Such a screen is one in which dye is applied and absorbed by the screen, the dye absorbing the light, and thus, producing the reduction in light reaching the camera film. The screen is made of multiple coats of plastic material, is light, tough, and, when mounted in its frame, may be easily moved about to the desired locations. In U. S. Patent No. 2,558,243 of June 26, 1951, a method of construction and the screen filter having a certain impregnating dye is disclosed and claimed. The present invention utilizes the same basic construction, but with an improved dye.

The principal object of the invention, therefore, is to facilitate the obtaining of light intensity balances between areas having different illuminations.

Another object of the invention is to provide an improved light reducing screen for large areas.

A further object of the invention is to provide an improved plastic light filter for balancing the light intensity between various areas having different illuminations, such as interiors with artificial illumination and exteriors with natural sunlight.

A still further object of the invention is to provide an improved method of constructing a multiple layer plastic screen having uniform light reducing properties throughout.

A still further object of the invention is to provide an improved dye solution for a plastic light filter for balancing light intensities.

Figure 2:
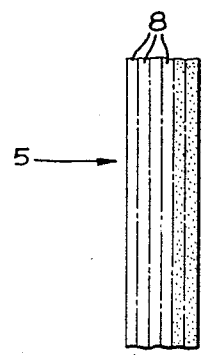

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an elevational view of the screen of the invention mounted in its frame, and Fig. 2 is an enlarged cross-sectional view illustrating the construction of the screen.

Referring now to the drawings, a screen 5 is mounted in the usual manner within a rigid frame 6 and laced by rubber bands or cords 7 through grommets in the screen and holes in the frame. Any suitable means of support not shown may be used. In Fig. 2, the screen is shown for purposes of illustration as made up of a plurality of coats or layers 8, in which the two last layers on the right are shown impregnated by a dye. Although the dye is shown in only these layers, it is to be understood that it may extend to only one layer or into more than two layers in accordance with the amount of light reduction required. Furthermore, since each layer or coat is of the same material, there is actually no line of separation between layers, the screen being homogeneous.

Referring now to the actual construction of the screen, it is built up in layers or coats, each coat being applied as a solution to a pre-prepared matrix made in accordance with my copending application, Ser. No. 40,667, filed July 26, 1948, now Patent No. 2,558,244. The last coat of the matrix has the following formula, the bracketed items being diluents to adjust viscosity:

| | | |
|---|---|---|
| Cellulose acetate | gms | 400 |
| Acetone | cc | 1995 |
| Ethanol | cc | 215 |
| 2 nitro propane | cc | (715) |
| Ethylene glycol monomethyl ether acetate | cc | (715) |
| Toluene | cc | (383) |

The screen is made of a formula which I refer to as M-3, and given hereinafter, the dye being applied after the required number of coats have been applied to build the screen up to the desired thickness. For instance, the base solution is first placed in a dip-pan and the surface of a matrix on a cylindrical drum is passed therethrough to apply each coat, which is dried before the application of the next coat. The base is generally of sufficient tensile strength and toughness after the application of six coats, which provides a screen of substantially .007 inch thick. The formula for the base layers is as follows:

| | | |
|---|---|---|
| Ethyl cellulose | gms | 744 |
| Xylol | cc | 3468 |
| Ethylene glycol monomethyl ether | cc | 827 |
| Butyl alcohol | cc | 827 |
| Methyl isobutyl ketone | cc | 827 |
| Methyl phthalyl ethyl glycollate | cc | 48 |

The above formula is adjusted to a viscosity of 42 at 24 degrees C., the application speed for a drum of approximately five feet, ten inches in diameter, being one revolution in sixteen minutes.

The dye solvent is toluene and 1000 cc. is used with the following dye formula:

Blue oil, colour index 1075____ 1.420 gms. or 77%.
Yellow oil, colour index 61____ 1.0346 gms. or 4%.
Red oil, colour index 258_____ .30 gm. or 19%.

The solvent and dyes are thoroughly mixed and placed in a dip-pan and applied by revolving the drum, and thus, rotating the homogeneous base. The base is allowed to dry for at least two hours before applying the dye coat.

This dye formula has been found to be more economical, more stable, and more easily controlled for different degrees of light absorption. It is also made up of ingredients readily obtainable.

The above screen has a neutral density that decreases the intensity of all components of the visible spectrum in substantially the same proportion, and, by varying the dye coat, will produce different amounts of light reduction, the above formula being that used for bright sunlight to balance normal artificial light in an interior. That is, the above dye formula provides sixty-five percent absorption of light, only one dye coat being applied at a drum speed of one revolution in ten minutes, the drum having a diameter of approximately five feet, ten inches. To vary the absorption, the drum speed is varied. For instance, to determine the drum speed for a specific value of light absorption, a drum having an approximate circumference of fifteen feet has its speed varied each three feet, thus providing five test strips. This permits a graph of drum speed versus light transmission to be made, the drum being rotated at a constant selected speed for the final screen, the dye being uniformly applied to the entire screen.

If the desired absorption is not within the range of speeds selected for proper application of the dye coat, the dye formula may be strengthened or weakened by proportionately increasing the dye ingredients with respect to the solvents and another series of speed tests made. By comparing the strips with established filters of known absorptions, using the log sector for photospectrometer tests, the desired speed of rotation for the drum is determined.

The screen is cut by strings placed under the last coat of the base and then stripped from its matrix and placed in the frame 6 of proper size. It is then ready for use as described above.

I claim:

1. A light filter screen comprising a base made up of separately applied layers of a cellulose base, said base being homogeneous and containing a mixture of substantially 1.420 grams of blue oil dye, 1.0346 grams of yellow oil dye, and .30 gram of red oil dye dissolved in a solvent, the amount of said mixture in said base controlling the amount of light absorption by said screen, said blue dye having a colour index of 1075, said yellow dye a colour index of 61, and said red dye a colour index of 258.

2. A light filter screen in accordance with claim 1, in which said solvent is substantially 1000 cc. of toluene.

3. A light filter screen comprising a base made up of separately applied layers of a cellulose base, said base being homogeneous and containing a mixture of substantially seventy-seven percent of blue oil dye having a colour index of 1075, four percent of yellow oil dye having a colour index of 61, and nineteen percent of red oil dye having a colour index of 258, all of said dyes being dissolved in a solvent, the amount of said mixture in said base controlling the amount of light absorption by said screen.

4. A light filter screen in accordance with claim 3, in which said solvent is substantially 1000 cc. of toluene.

JAMES A. GIBBONS.

REFERENCES CITED

The following references are of record in the file of this patent:

UNITED STATES PATENTS

| Number | Name | Date |
|---|---|---|
| 2,058,433 | Felix et al. | Oct. 27, 1936 |
| 2,094,770 | Ellis et al. | Oct. 5, 1937 |
| 2,384,734 | Felix et al. | Sept. 11, 1945 |
| 2,440,070 | Blout et al. | Apr. 20, 1948 |
| 2,525,638 | Blout et al. | Oct. 10, 1950 |
| 2,534,654 | Barnes | Dec. 19, 1950 |
| 2,558,243 | Gibbons | June 26, 1951 |